US005658645A

United States Patent [19]

Lafond

[11] Patent Number: 5,658,645

[45] **Date of Patent: *Aug. 19, 1997**

[54] INSULATION STRIP AND METHOD FOR SINGLE AND MULTIPLE ATMOSPHERE INSULATING ASSEMBLIES

[76] Inventor: Luc Lafond, 23 Woodvalley Drive, Etobicoke, Ontario, Canada, M9A 4H4

[ * ] Notice: The term of this patent shall not extend beyond the expiration date of Pat. No. 5,443,871.

[21] Appl. No.: 483,854

[22] Filed: Jun. 7, 1995

Related U.S. Application Data

[63] Continuation-in-part of Ser. No. 417,896, Apr. 6, 1995, Pat. No. 5,498,451, which is a continuation-in-part of Ser. No. 964,051, Oct. 21, 1992, Pat. No. 5,443,871.

[30] Foreign Application Priority Data

Oct. 25, 1991 [CA] Canada .................................. 2054272
Apr. 2, 1992 [CA] Canada .................................. 2064988

[51] Int. Cl.$^{6}$ .............................. B32B 3/00; B32B 23/02

[52] U.S. Cl. .......................................... 428/192; 428/174

[58] Field of Search ............................... 428/34, 192, 81, 428/120, 131, 174, 542.8, 543; 52/786.1, 786.13

[56] References Cited

U.S. PATENT DOCUMENTS

| | | | |
|---|---|---|---|
| 4,113,905 | 9/1978 | Feasler | 428/34 |
| 4,368,226 | 1/1983 | Mucavia | 428/34 |
| 5,094,055 | 3/1992 | Berdan | 428/34 |
| 5,443,871 | 8/1995 | Lafond | 428/34 |

*Primary Examiner*—Donald Loney
*Attorney, Agent, or Firm*—Paul Sharpe, McFadden, Fincham

[57] ABSTRACT

There are disclosed spacer elements for use in insulated glass assemblies of the single and multiple atmosphere type which incorporate non-thermally conductive materials as the main structural support member in the assembly. The result is a lightweight, warm edge assembly.

10 Claims, 5 Drawing Sheets

INSULATION STRIP AND METHOD FOR SINGLE AND MULTIPLE ATMOSPHERE INSULATING ASSEMBLIES

This is a continuation-in-part application of U.S. Ser. No. 417,896 filed Apr. 6, 1995, now U.S. Pat. No. 5,498,451 which in turn is a continuation-in-part application of U.S. Ser. No. 07/964,051 filed Oct. 21, 1992 now U.S. Pat. No. 5,443,871.

FIELD OF THE INVENTION

The present invention relates to spacer elements for insulated glass assemblies having a single as well as a divided atmosphere therebetween.

BACKGROUND OF THE INVENTION

The prior art provides a complete plethora of insulated glass assemblies, sealant strips and spacer elements and improvements thereto used in insulated glass assemblies.

The modifications and improvements to the strips etc. have all had a common goal, namely, to improve the insulation capacity for such assemblies without sacrificing structural integrity or moisture degradation of the assembly.

Although the art is replete with such assemblies, it fails to provide an insulating sealant strip which provides:

i) warm edge technology;

ii) non-ultraviolet degradable material; or iii) elastic deformation between the glass lites.

Typical of the art in the field of the present invention includes U.S. Pat. No. 4,576,841. This patent discloses the use of an aluminum foil into which is positioned desiccant material. Such an arrangement has two inherent limitations, namely:

i) aluminum is a thermal conductor which results in thermal transmission and thus obvious energy expenditures; and ii) since the tube is solid, elastic recovery from the compression of glass lites engaged with the same is negligible.

Further, U.S. Pat. No. 4,113,905 discloses a composite foam spacer comprising an extruded tubular profile having an outer coating of foam material thereon. The spacer further includes projecting edges which project laterally relative to the longitudinal axis of the spacer. Although a useful arrangement, the spacer does not facilitate compression dampening and, if the spacer were compressed, this would result in unnatural force dispersion due to the projecting edges which may lead to breakage of the substrates. Further, if compressed, the spacer element may disrupt sealant material associated therewith thus leading to an ineffective seal.

Mucaria, in U.S. Pat. No. 4,368,226 provides a glass assembly in which there is included aluminum spacers. As such, the arrangement is limited similar to U.S. Pat. No. 4,576,841 as discussed herein previously.

Further prior art in the field of the present invention includes U.S. Pat. Nos. 4,536,424; 4,822,649; 4,952,430; 4,476,169; 4,500,572; and Canadian Patent Nos. 884,186; 861,839; and 1,008,307.

SUMMARY OF THE INVENTION

Thus, having regard to the prior art arrangements, there exists a need for a sealant strip which provides a partitioned atmosphere, high insulation value and hygroscopic capabilities without creating an unnecessarily complicated arrangement; the present invention fulfils this need.

According to one object of the present invention, there is provided an insulated glass spacer element comprising a pair of spaced apart substrate engaging members each having a top and bottom surface; a base extending between and connected to each bottom surface of each of the substrate engaging members, and a support member extending between the substrate engaging member and connected to the top surface of one of the substrate engaging members.

The spacer element is preferably a fabricated from a resiliently deformable material to allow flexure of the same.

In a preferred form, the support member extends diagonally between the substrate engaging surfaces to partition the area therebetween. Applicant has found that such an arrangement is well suited to dampening compression between substrates engaged therewith in an insulated glass assembly and accordingly, it is a further object of the present invention, to provide an insulated glass assembly comprising a pair of glass lites; an elastically deformable body having a first substrate engaging member associated therewith; a second substrate engaging member spaced from the first substrate engaging surface, the second substrate engaging surface being operatively associated with the body and extending therefrom, whereby when a glass lite is engaged with the first substrate engaging member and the second substrate engaging member, the second substrate engaging member facilitates limited resilient compression of the assembly.

The spacer element according to a further embodiment of the present invention may be used in combination with a similar spacer element to provide a multiple atmosphere insulated assembly. Such an arrangement is extremely useful for dual insulated window assemblies commonly used in highrises. Previously, aluminum extruded bodies not capable of providing warm edge technology had to be used for such an application. Thus, a further object of the present invention is to provide an insulated glass assembly having opposed substrates with an atmosphere therebetween and sheet material extending between the opposed substrates comprising a pair of glass lites; a sheet of flexible material, a pair of insulating spacer members, each of the spacer members having a sheet engaging member for engaging the sheet material, a substrate engaging member, each of the substrate engaging member and the sheet engaging member having an upper and lower edge, a base extending between and connected to each the upper edge of each the substrate engaging member and the sheet engaging member, a support member extending between the engaging surfaces and connected to the lower edge of the substrate engaging surface whereby when the substrates are engaged with the substrate engaging surfaces of each of the spacer members and the engaging surface of each of the spacer members is in facing relation, the sheet material extends within the atmosphere spaced from the opposed substrates, whereby when the substrates are engaged with the substrate engaging surfaces the sheet material extends within the atmosphere spaced from each of the substrates engaged with the insulating bodies.

In applications where compressive forces are not so extreme, a further embodiment of the present invention is provided which comprises a support member for supporting and spacing opposed substrates in a window construction comprising a self-supporting elastically deformable body having a pair of opposed and spaced apart arms each adapted to engage one of the substrates, the arms extending outwardly from the body at either end thereof, the body having a width sufficient to space the opposed substrates apart from one another, and desiccant receiving means associated with the main body and adapted to receive desiccant material therein.

In one variation of the present invention, the generally vertically oriented support member may function solely as a supporting member; alternately, this supporting element may be of a corrugated nature which functions to permit some flexing of the support member to relieve stress on double glass lites formed into an assembly where stress may be encountered due to wind or atmospheric conditions which will cause flexing of the glass panes or lites with consequent flexing of the spacer element or strip. In this way, where large surface areas of glass panes are used in conjunction with the spacer element, a degree of flexibility can be provided without disrupting the integrity of the spacer element.

In a still further embodiment, the vertically oriented as well as the angularly disposed supporting members of the spacer element may include additional reinforcing means such as by including an embossed structure thereon. Such an embossed structure could be in the form of a plurality of spaced apart ribs, etc.

A coating may be applied over the outer chamber or insulative body to protect the material therein, such a coating may be in the form of a silicon coating. Alternatively, a suitable end cap may be provided to protect the material within the outer chamber.

Preferably, the spacer strip of the present invention includes a integral polymeric support frame which includes a first generally horizontal arm, the angularly disposed support arm forming a second arm extending from one end of the first horizontal arm; a third generally horizontal arm extending from one end of the angularly disposed support arm; the vertically oriented support arm forming a fourth arm extending downwardly from the third horizontal arm. The first and third horizontal arms being generally parallel. In this arrangement, the first and third horizontal arms form the strip portions which engage the glass lites.

In a particularly preferred arrangement, the polymeric support frame is also provided with a fifth horizontal arm which extends from the fourth arm and is adjacent and parallel to the first horizontal arm. In this arrangement, the third horizontal arm and the fifth horizontal arm from the strip portions which engage the glass lites.

Having thus generally described the invention, reference will now be made to the accompanying drawings, illustrating preferred embodiments.

DETAILED DESCRIPTION OF THE PREFERRED EMBODIMENTS

Figure 1:
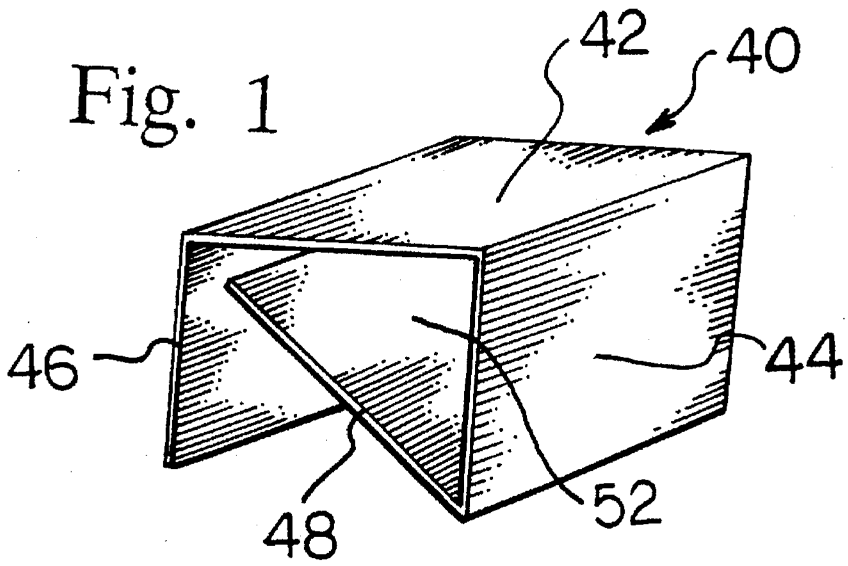
FIG. 1 a perspective view of one alternate embodiment of the spacer strip according to the present invention.
Figure 2:
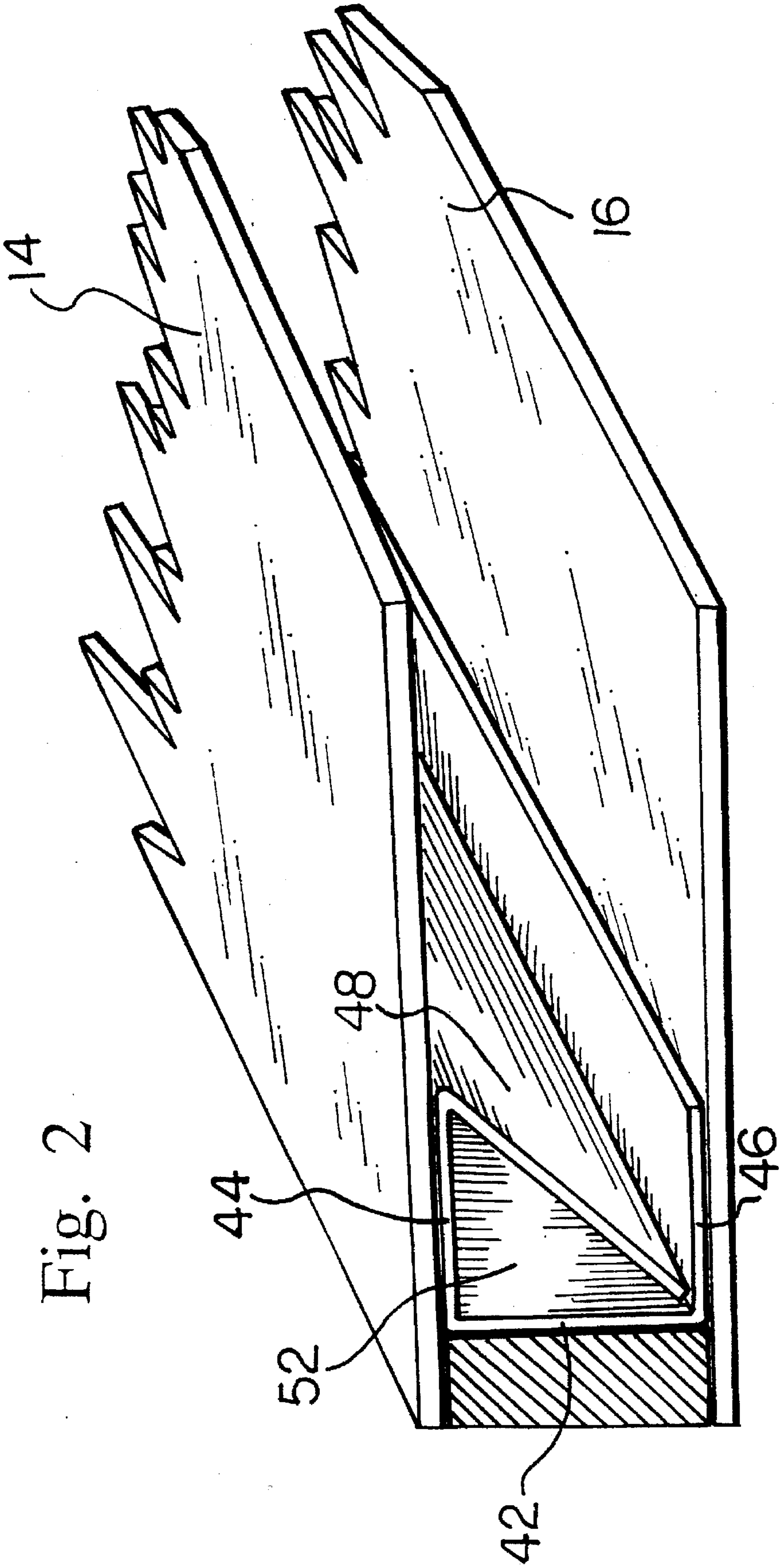
FIG. 2 is a perspective view of the strip as positioned between two substrates.

Referring now to FIGS. 1 and 2, shown is a first embodiment of the present invention.

FIG. 1 illustrates a perspective view of a spacer member, generally indicated by numeral 40, comprising a body resiliently compressible material such as those discussed herein previously.

The spacer 40, as illustrated in FIG. 1, includes a base 42 extending between and connected to substrate engaging members 44 and 46. The members 44 and 46 project from the base 42. Extending diagonally between the members 44 and 46 is a support member which is flexibly connected at one end to one of the engaging members 44 and 46, shown in the illustrated example as member 48. The other end of the support member 48 is free.

The spacer 40, according to this embodiment, may be fixed between a pair of opposed substrates 14 and 16 as illustrated in FIG. 2, by providing a butyl material such as polyisobutylene between each substrate and a respective engaging member 44 or 46 or may be adhered thereto using other suitable materials or methods.

The structure of the spacer 40 of this embodiment is particularly efficient for compression damping to thus prevent seal disruption and/or substrate fracture. The support member 48, being diagonally disposed between the substrate engaging members 44 and 46, is useful for this purpose. Upon compression of the substrates 14 and 16, the engaging members 44 and 46 flex somewhat towards one another which, in turn, results in the support member absorbing at least some of the force.

The spacer 40 may be extruded in the form illustrated in the drawings, or may be formed from an elongated length or sheet. Applicant has found that the use of the polyethylene terephthalate class of polymers as well as the polyvinyl halide polymers provide these properties and are extremely useful for highly efficient insulated glass assemblies. These materials are generally elastically deformable and are capable of resilient compression, while additionally providing a warm edge unit.

Further, the support member 48, as disposed between the members 44 and 46 provides a longitudinal generally tubular opening into which may be charged desiccant, butyl material, silicone material and other such materials. Suitable desiccant material may be selected from, for example, zeolites, silica gel, calcium chloride, alumina etc. The material selected may be loose or dispersed in a permeable matrix of, for example, silicone. This material has been removed to more clearly illustrate the structure of spacer 40.

Figure 3:
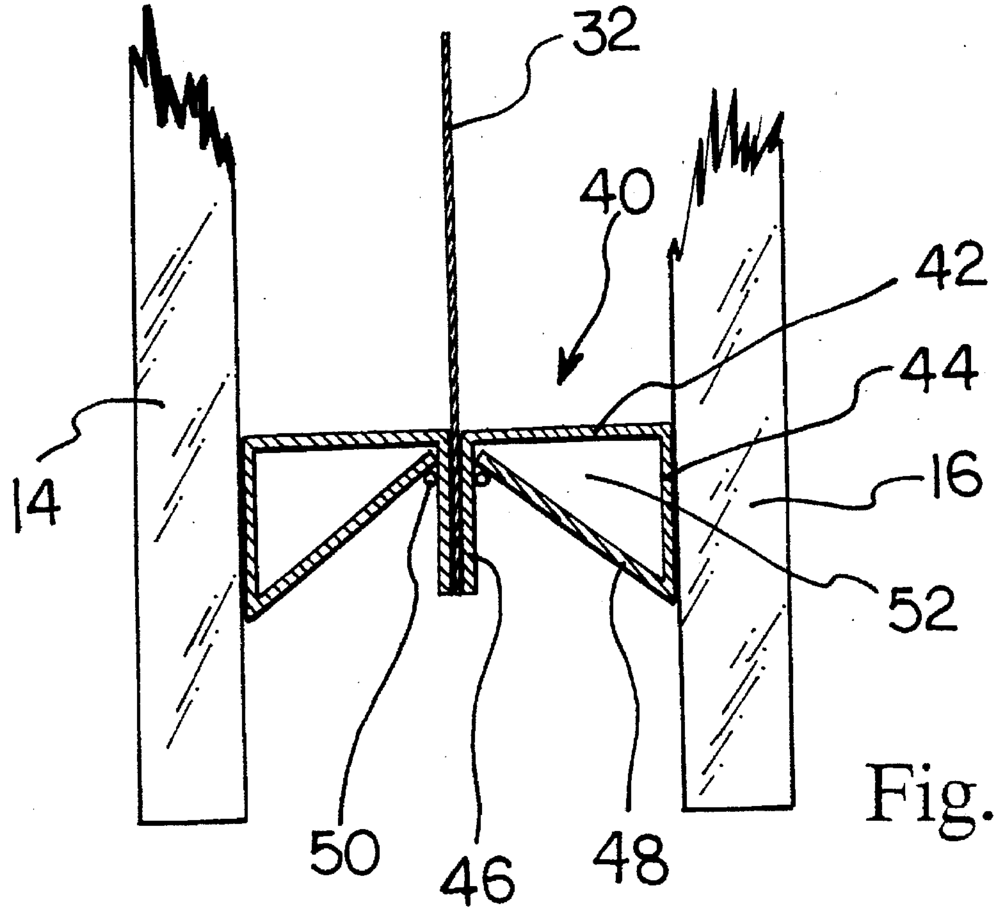
FIG. 3 is an end view of a further alternate embodiment of the spacer strip of the present invention.

FIG. 3 illustrates yet a further embodiment of the invention in which the spacer 40 is in opposition with a similar spacer for a dual atmosphere assembly. In this arrangement, substrate engaging members 46 of each of the spacer 40 each function as sheet engaging menders for maintaining the sheet material 32 taut between the substrates 14 and 16.

The film divides the atmosphere between the substrates 14 and 16 into separate air spaces such as is known dual seal insulated glass units. The film may comprise any of the known materials employed by those skilled in the art e.g. vinylidene polymers, PVC, PET, etc. Where ultraviolet exposure is a concern, the sheet may comprise a suitable UV screening material, e.g. Tedlar™.

Suitable adhesives or butyl material may be positioned between the facing engaging members 46 for securing the same and sheet material together. Similar to the embodiment of FIG. 2, suitable adhesive materials will be provided for engaging menders 44 for sealing engagement with substrates 14 and 16.

A bead 50 of butyl material can be positioned adjacent the free end of the support member 48 of each spacer 40 to maintain the same and adjacent with the corner formed by the base 42 and substrate engaging member 44.

Due to the disposition of the support member 48 in the spacer 40, a tubular form 52 is created which may receive desiccant material therein.

In an alternate form, the base 42 may include desiccant receiving means such as pockets embossed in base 42 to receive desiccant material.

Further, although the embodiment illustrated in FIG. 3 comprises two separate spacers 40, it will be appreciated by those skilled in the art that the two may be coextruded as a single piece in which provision would be made to allow reception of the sheet material 32 therebetween.

FIGS. 4 through 7 illustrate further forms of the spacer in which similar elements from previous embodiments are denoted with similar numerals.

Figure 4:
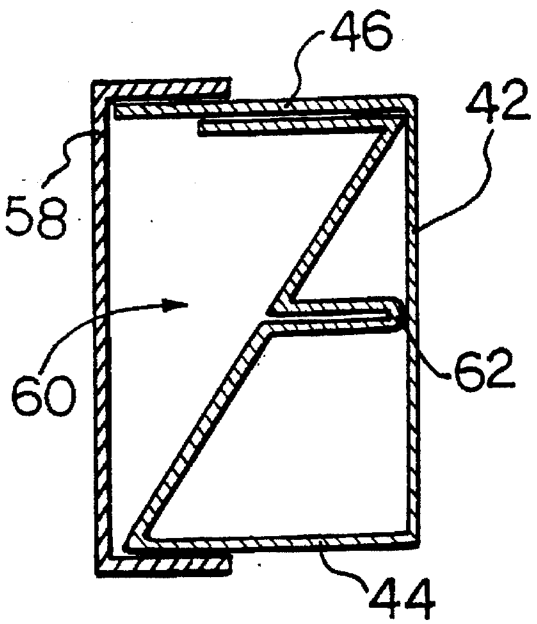
FIGS. 4 through 7 are end views of the spacer strip according to further embodiments.

Referring to FIG. 4 in greater detail, a support member 60 extends between engaging members 44 and 46 to divide the same, similar to the support member 48 from previous embodiments. The primary differences in the structure of support member 60 reside in a transversely extending partitioning member 62 positioned adjacent base 42.

Figure 5:
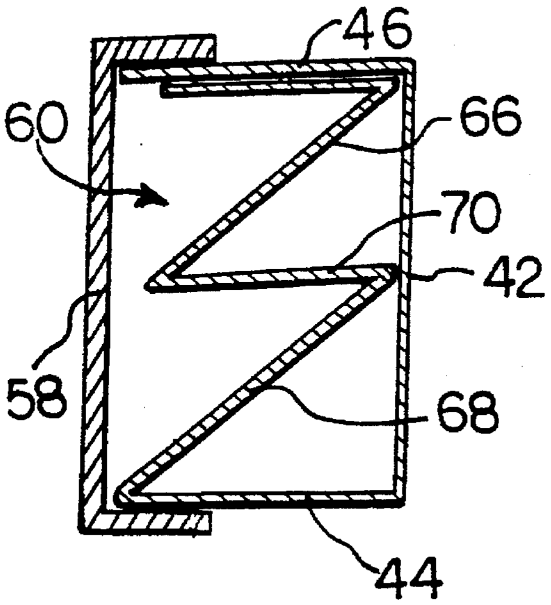

FIG. 5 shows a further embodiment in which the support member, represented by numeral 64 in this embodiment, includes two generally diagonal portions 66 and 68 joined by a transversely extending portion 70.

Figure 6:
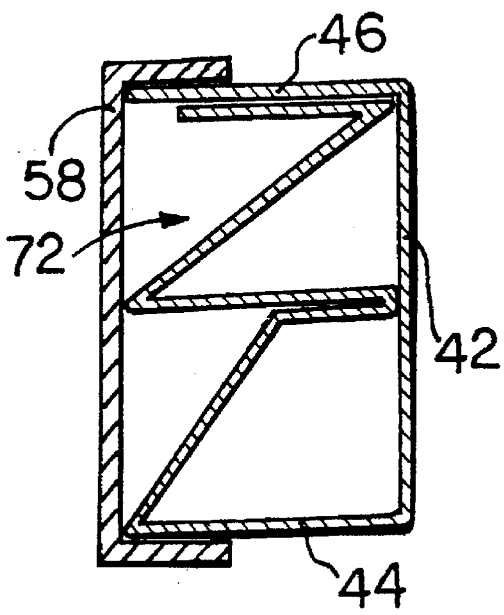

FIG. 6 represents a composite of the support members 60 and 64 of FIGS. 4 and 5, respectively. Support member 72 in this embodiment corresponds in structure to portion 66 illustrated in Figures and the lower portion of the support member illustrated in FIG. 4.

Figure 7:
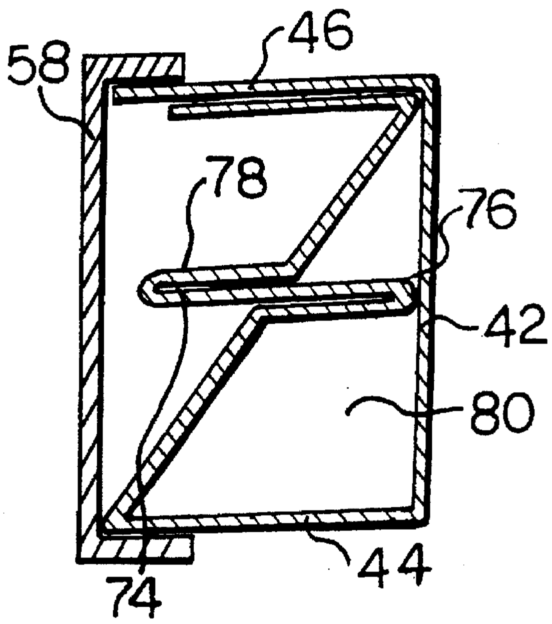

FIG. 7 illustrates yet another embodiment for the spacer in which the support member includes partitioning members 74 and 76. In this manner, the desiccated material area 78 is divided as is the hollow air containing area 80.

In the embodiments illustrated in FIGS. 4 through 7, as well as herein previously, each spacer 40 may include a cap 58 comprising a polysilicone and desiccant material therein. This material would, in use, be directed to the interior volume of the window assembly.

The use of the partitioned structure for the spacer improves the thermal performance of the spacer by breaking the conductivity path in the silicone and separating the air filled area into a plurality of areas.

Figure 8:
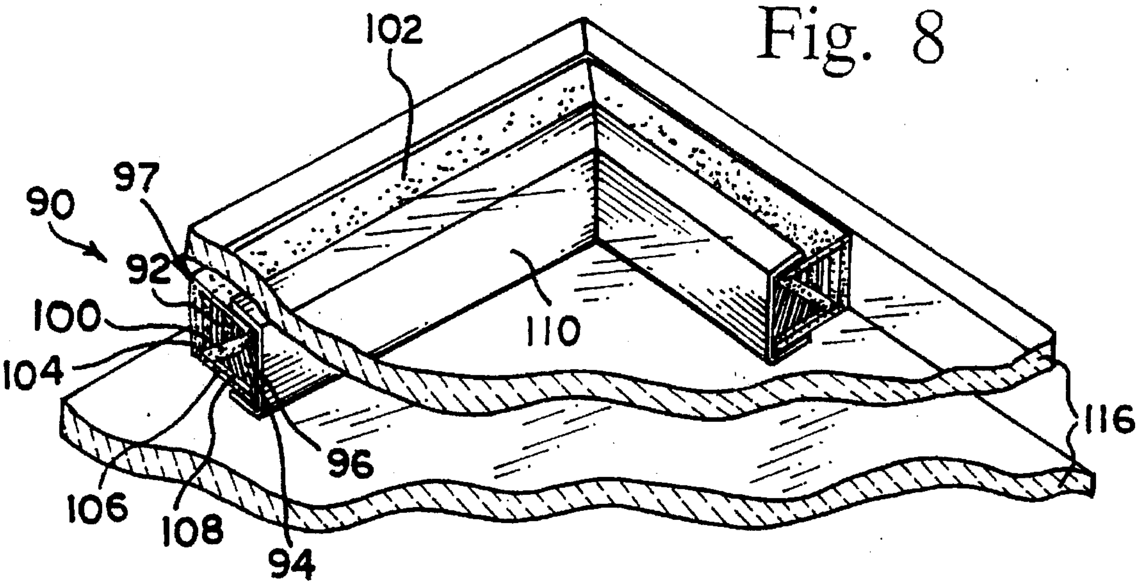
FIG. 8 is a perspective view of a part of an insulated window assembly utilizing one embodiment of the insulative spacer strip of the present invention.
Figure 9:
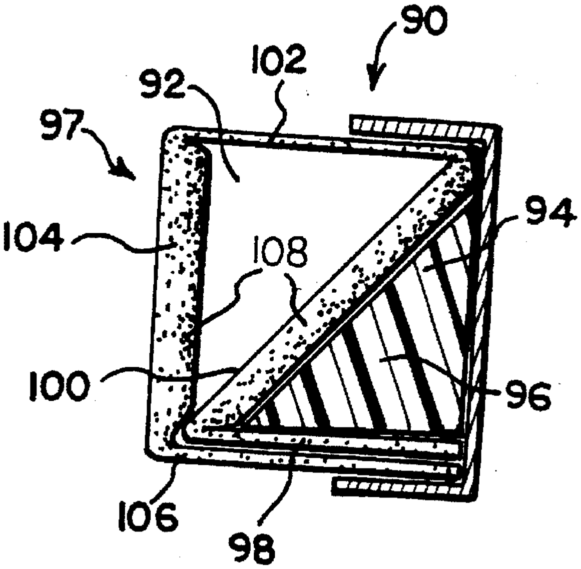
FIG. 9 is an end view of the spacer strip illustrated in FIG. 8.

Reference will be initially made to FIGS. 8 and 9, which illustrate yet another embodiment of the spacer of the present invention.

The spacer strip of this embodiment, generally designated by reference numeral 90, includes a first insulative body 92 and a second insulative body 94. The first insulative body 92 is a generally hollow body which includes air therein, air being known as a good insulative material. Alternatively, the first insulative body 92 may include any suitable insulative material therein (not shown). The second insulative body includes a desiccant material 96 therein which may be selected from those materials discussed herein previously.

The insulative bodies 92 and 94 are formed by a rigid polymeric support frame structure, generally designated by reference numeral 97.

The rigid polymeric support frame member 97 is preferably of a one-piece unitary construction, although other constructions may be utilized such as two or more different coextruded or laminated strips.

The rigid polymeric support frame 97, as best illustrated in FIG. 9, includes a first arm 98 which is generally horizontally oriented, a second arm 100 which is generally angularly oriented, a third arm 102 which is generally horizontally oriented and is generally parallel to the first arm 98, a fourth arm 104 which is generally vertically oriented and a fifth arm 106 which is generally horizontally oriented.

The support frame 97 preferably has a thickness of approximately 0.005" to 0.030 inch and is of any suitable material which is self-supporting and suitably rigid such as polyolefins, polyesters, silicones and polyamides; polyesters being particularly preferred. If desired, the support frame 97 may also have a metallized surface or surfaces.

As best seen from FIG. 9, the fifth arm 106 is preferably parallel, adjacent and coextensive with the first arm 98; although the first arm 98 may be shorter or larger than the fifth arm 106. In a particularly preferred form, the fifth arm 106 and the first arm 98 are fixedly secured together by way of any suitable adhesive means (not shown) and the first arm 98, the second arm 100 and the third arm 102 form a generally "Z" shaped configuration.

Both the second arm 100 and the fourth arm 104 preferably have embossments 108 thereon. Such embossments 108, which may be in the form of spaced apart ribs, add strength to the support frame structure 97. It is contemplated that the embossed structures 108 may also include a desiccant material therein as previously discussed for earlier embodiments.

As will be noted, from FIG. 9 in particular, the second arm 100 forms a common border for each of the insulative bodies 92 and 94.

An end member 110 may be provided which covers and protects the desiccant material 96 in the second insulative body 94 and extends from the fifth arm 106 to the third arm 102. Such an end member may be in the form of any suitable polymeric coating or may be in the form of an end cap of any suitable material. Preferably, such an end member is in the form of a silicone coating having a UV resistant additive and further having the property of preventing rapid moisture absorption and saturation of the desiccant material 96 when exposed to atmospheric conditions, and providing sufficient necessary moisture absorption when between two panes of glass.

As best illustrated in FIG. 8, when the spacer strip 90 of the present invention is assembled between two panes of glass 116, the third arm 102 and the fifth arm 106 are fixedly secured to the panes of glass 116 by way of any suitable adhesive.

Figure 10:
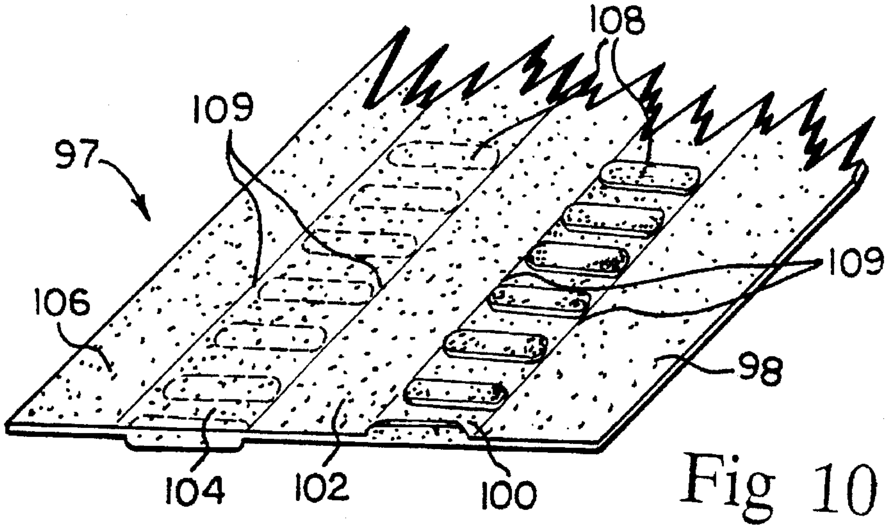
FIG. 10 is a laid-open view of the rigid polymeric support frame of the spacer strip illustrated in FIG. 9.

FIG. 10 illustrates the rigid polymeric support frame 97, as described above with reference to FIGS. 8 and 9, in a laid out condition. The embossments 108 on the second arm 100 and the fourth arm 104 are readily apparent from this Figure. Although in FIG. 10, the embossments 108 on the second arm 100 are shown on the top surface, and the embossments 108 on the fourth arm 104 are shown on the bottom surface, it will be understood that the embossments 108 could be on either or both of the surfaces of arms 100 and 104.

To form the spacer strip, the rigid polymeric support frame 97 is bent along the margins 109 to form the first horizontal arm 98, the second angularly disposed arm 100, the third horizontal arm 102, the fourth generally vertical arm 104 and the fifth horizontal arm 106 (see polymeric support frame 97 in the spacer strip illustrated in FIGS. 8 and 9).

Figure 11:
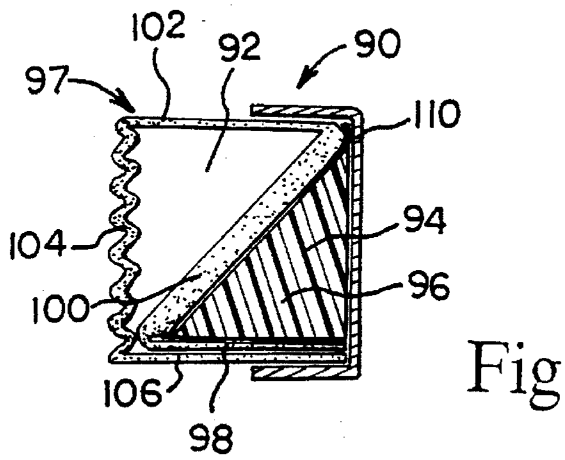
FIG. 11 is an end view of an alternate embodiment of the spacer strip of the present invention.

FIG. 11 illustrates an alternative embodiment of the present invention. The embodiment of FIG. 11 is very similar to the embodiment illustrated in FIG. 9, with like reference numerals designating like parts.

In the embodiment of FIG. 11, however, the fourth arm 104 is of a corrugated construction, which permits some flexing of this support member to release stresses. All other elements of this embodiment are as shown and described with reference to FIGS. 8 to 10.

Figure 12:
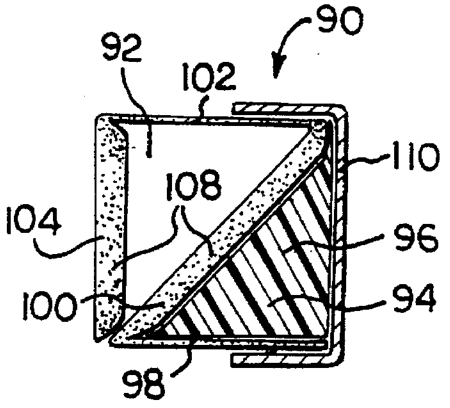
FIG. 12 is an end view of another alternate embodiment of the spacer strip of the present invention.

FIG. 12 illustrates another embodiment of the spacer strip 90 of the present invention, which again is very similar to the embodiment of FIG. 2, with like reference numerals designating like parts. In the FIG. 12 embodiment, the support frame 97 does not include a fifth arm. The end cap 110 covering the desiccant material 96 extends from the first arm 98 to the third arm 102. In this embodiment, the first arm 98 and the third arm 102 form the strips which engage the glass panels, and are affixed thereto by any suitable adhesive.

Figure 13:
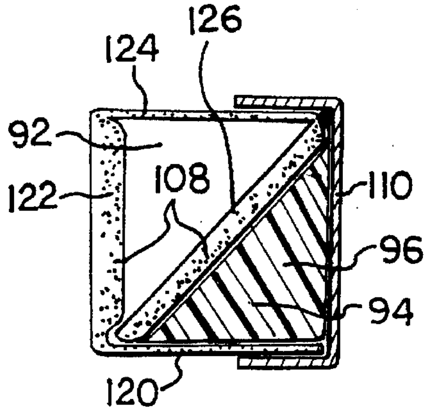
FIG. 13 is an end view of a further alternate embodiment of the spacer strip of the present invention.

A further embodiment of the present invention is illustrated in FIG. 13. In this embodiment, a first arm 120 is provided which is generally horizontal. A second arm 122, which is generally vertical, extends upwardly from one end of the first arm 120. A third arm 124 which is parallel to the first arm 120 extends from the second arm 122 and a fourth arm 126 is angularly disposed and extends downwardly from the third arm 124, the fourth arm 126 has a free end which is adjacent the point where the first arm 120 and the second arm 122 are joined. The fourth arm 126 forming a common border between the first and second insulative bodies 92 and 94. In this arrangement, the first arm 120 and the third arm 124 form the glass lite engaging strips and the end cap 110 covering the desiccant material 96 extends from the first arm 120 and the third arm 124.

As those skilled in the art will realize, these preferred illustrated details can be subjected to substantial variation, without affecting the function of the illustrated embodiments. Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An insulated glass spacer element comprising:

a pair of spaced apart substrate engaging members each having a top and bottom surface;

a base extending between and connected to each bottom surface of each of said substrate engaging members; and a support member extending between said substrate engaging members and connected to said top surface of one of said substrate engaging members.

2. The spacer element as defined in claim 1, wherein said support member partitions a distance between said substrate engaging members.

3. The spacer element as defined in claim 2, wherein said spacer includes a plurality of partitioned areas.

4. The spacer element as defined in claim 1, wherein said support member extends diagonally between said substrate engaging members.

5. The spacer element as defined in claim 1, wherein said support member is pivotally connected to said top surface.

6. The spacer element as defined in claim 5, wherein said support member includes a free end.

7. The spacer element as defined in claim 2, wherein said support member includes, relative to said substrate engaging members, at least one transversely extending portion.

8. The spacer element as defined in claim 7, wherein said transversely extending portion partitions said distance between said substrate engaging members.

9. The spacer element as defined in claim 4, wherein said support member is integral with said top surface.

10. The spacer element as defined in claim 1, wherein said spacer element is continuous.

* * * * *